(12) United States Patent
Scanlon et al.

(10) Patent No.: US 7,193,986 B2
(45) Date of Patent: Mar. 20, 2007

(54) WIRELESS NETWORK MEDIUM ACCESS CONTROL PROTOCOL

(75) Inventors: WilliamGiles Scanlon, Larne (GB); Tze-Yeung Chui, Belfast (GB)

(73) Assignee: Nortel Networks Limited, St. Laurent (CA)

( * ) Notice: Subject to any disclaimer, the term of this patent is extended or adjusted under 35 U.S.C. 154(b) by 1091 days.

(21) Appl. No.: 10/158,680

(22) Filed: May 30, 2002

(65) Prior Publication Data

US 2003/0231607 A1    Dec. 18, 2003

(51) Int. Cl.
  *H04Q 7/24* (2006.01)
(52) U.S. Cl. .................................... 370/338
(58) Field of Classification Search ........ 370/337–338, 370/347, 419, 470–474; 455/435.1–435.3, 455/500, 502–503, 507–515
See application file for complete search history.

(56) References Cited

U.S. PATENT DOCUMENTS

| | | | | |
|---|---|---|---|---|
| 6,088,337 A | * | 7/2000 | Eastmond et al. | 370/280 |
| 6,498,936 B1 | * | 12/2002 | Raith | 455/466 |
| 6,795,418 B2 | * | 9/2004 | Choi | 370/336 |
| 6,947,446 B2 | * | 9/2005 | LoGalbo et al. | 370/468 |
| 2002/0115458 A1 | * | 8/2002 | Mizuno et al. | 455/507 |

* cited by examiner

*Primary Examiner*—Doris H. To
*Assistant Examiner*—Thai Hoang
(74) *Attorney, Agent, or Firm*—Barnes & Thornburg

(57) ABSTRACT

A device for use in a packet-oriented transmission network comprises a transmitter arranged to transmit a sequence comprising at least one data packet and a receiver arranged to receive a sequence comprising at least one data packet. At least one data packet in one of the transmitted or received sequence of data packets includes at least one pointer to indicate when a designated data packet in the sequence is to be received and/or transmitted. The designated data packet includes an indication of at least one other device connected to the packet-oriented transmission network.

9 Claims, 9 Drawing Sheets

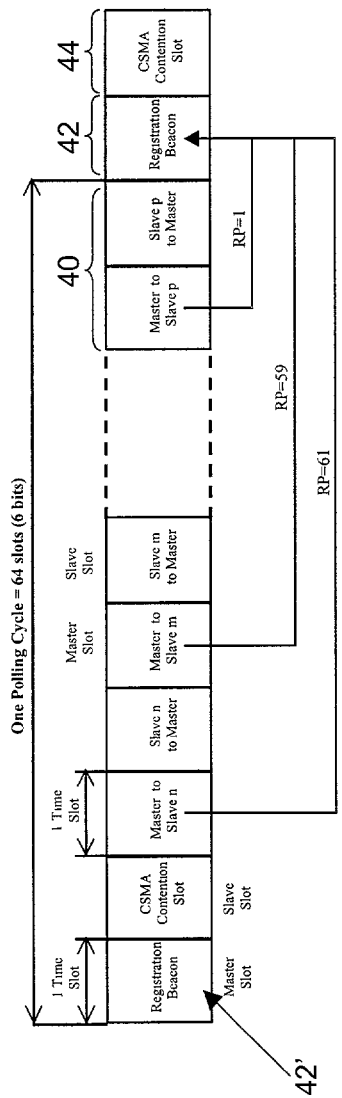
Figure 5
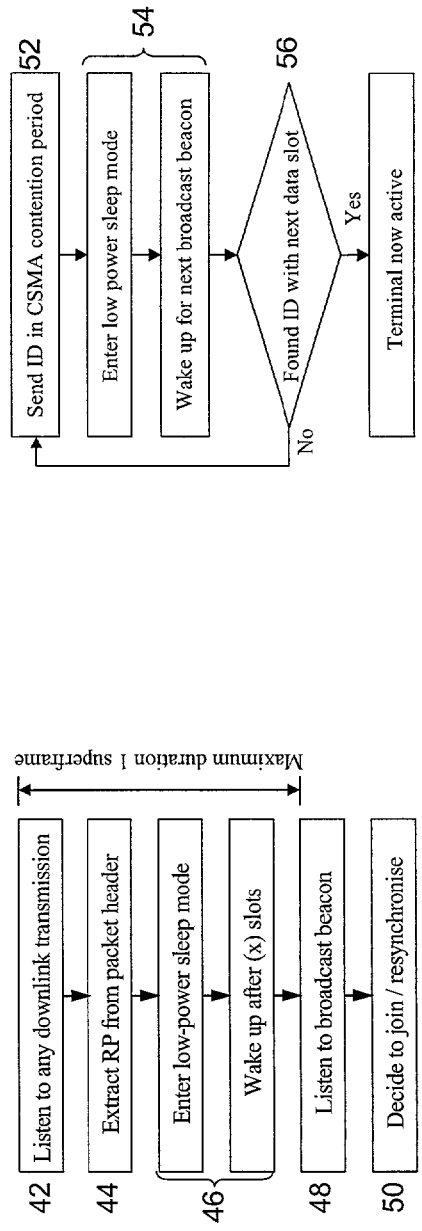
Figure 6(a)
Figure 6(b)

WIRELESS NETWORK MEDIUM ACCESS CONTROL PROTOCOL

The present invention relates to a wireless network system, a method of operating a device within a wireless network and a computer program product implementing a medium access control protocol for a wireless network device.

The rapid growth in the use of the Internet and e-mail over the last decade has led to an interest in data access using mobile wireless devices or portable terminals. Wireless-based wide area networks (WAN) have recently become available to users of cellular telephone based devices through technologies such as General Packet Radio Service (GPRS) and the third generation mobile network (IMT-2000). However, in the indoor environment, wireless local area networks (WLAN) continue to provide higher speed data access with lower costs for wireless devices compared to a cellular telephone based WAN.

FIG. 1, shows a conventional WLAN 10 including a plurality of mobile wireless devices 12 such as laptop computers, portable digital assistants (PDAs) or even "smart" cellular phones. The mobile wireless devices 12 communicate with fixed or wired devices such as printers 14, general purpose computers 16 or servers 18 via one or more access points 20. The access points 20 are in turn connected to the wired portion of the network via a medium such as an Ethernet bus 22. In this example, the access points are shown as stand-alone devices acting as bridges or routers broadcasting messages transmitted on the bus 22 to the wireless devices 12 and relaying messages received from the wireless devices 12 to LAN across the bus 22. It is also known for access points to be incorporated within nodes in the wired LAN, for example, within a computer acting as a master within a WLAN.

As an extension to an existing campus based network, a WLAN provides localised mobile access to both Internet and/or Intranet services. The type of system required is dependent on the intended use for the network, the range required and the types of user terminals supported. Consequently, several different wireless LAN technologies are under development including the IEEE 802.11 family, HiperLAN, Bluetooth and HomeRF, see "Design alternatives for wireless local area networks", Nicopolitidis P, Papadimitriou G I, Pomportsis A S, International Journal of Communication Systems 2001; 14(1):1–42.

As the radio spectrum is a shared resource, medium access control (MAC) protocols are extremely important in wireless network systems, particularly time slotted systems, as these allow terminals to be resynchronised after an outage. Outages are much more common in wireless systems than in wired systems as the indoor radio environment and the mobility of the terminal itself create temporal variations in link quality and possible loss of network connection. Specific physical layer problems include: intermittent hidden terminals—discussed in "Packet switching in radio channels: Part II—The hidden terminal problem in carrier sense multiple-access and the busy-tone solution", Tobagi F A, Kleinrock L., IEEE Trans. Communications 1975; 23(12):1417–1433; temporal variations in link quality—discussed in "Statistical characteristics of pedestrian-induced fading for a narrowband 2.45 GHz indoor channel.", Villanese F, Scanlon W G, Evans N E., Proc. IEEE Conf. Vehicular Technology 2000; 745–751; and the energy constraints of portable terminals—discussed in "System design issues for low-power, low-cost short range wireless networking.", Bhagwat P, Bisdikian C, Korpeoglu I, Krishma A, Naghshineh M., IEEE Intl. Conf. Personal Wireless Communications 1999; 264–268. Thus, to meet user expectations, wireless information access for personal and hand-held devices needs to be robust.

At the same time the portable terminals are often limited by their battery requirements and the MAC protocol also plays a large part in determining the power efficiency of a device. The miniaturisation and improved functionality of personal devices has led to a demand for longer operating times, decreased weight and increased cycle life in batteries.

These above issues are partially addressed by using packet-radio techniques. For example, personal area network (PAN) systems such as Bluetooth use time division techniques to reduce the energy consumption of terminals. The RF transceiver is only operational when transmitting, receiving a correctly addressed packet, or inspecting the header of each packet transmitted by the master node in the network. This approach is reasonably energy efficient for small numbers of nodes. However, the energy consumed during the inspection of packets destined for other nodes is wasted.

In relation to re-synchronising, in a Bluetooth network, the master periodically needs to suspend network activity to perform a lengthy inquiry, page and scan to admit new slaves to the network.

According to the present invention there is provided a wireless network system including a master wireless network device as claimed in claim 1 and one or more slave network devices as claimed in claim 9.

The present invention provides a wireless networking system particularly useful for hand-held portable computers and consumer devices such as personal digital assistants.

The system operates with a wireless MAC protocol using a resynchronisation pointer. The protocol offers improvements in the power efficiency of portable terminals and is robust in the presence of difficult radio propagation conditions.

In a comparison of the steady-state performance of the protocol employed with the preferred embodiment of the present invention vis-à-vis standard Bluetooth technology, there is a significant improvement in terminal energy efficiency when more than 1 slave device is active within the wireless network. Depending on the packet length and number of active slaves, the amount of energy wasted by the needless activation of a terminal's RF circuitry can be reduced by up to 70.8%. In addition, the protocol can deliver up to 42.8% more data for equal energy consumption than Bluetooth, while throughput is not significantly affected.

In the preferred embodiment, the combination of the resynchronisation pointer with a regular contention period for non-participating slave devices allows an uninterrupted network service to be maintained between the master and other participating slaves.

Further improved network performance can be achieved by taking advantage of the pointer-based approach of the preferred embodiment and introducing packet-by-packet adaptive scheduling to optimise both wireless network and terminal resources. Thus, unlike other proposed protocols such as disclosed in "Efficient power management policy in Bluetooth", Jang K, Lee T J, Kang H, Park J., IEICE Trans. Communications 2001; E84-B(8):2186–2192, the invention can be implemented with a variety of different packet scheduling strategies and is not limited to round robin.

Packet-by-packet scheduling and the use of a resynchronisation pointer enables rapid recovery from packet loss, while providing a fast method of terminal registration.

The preferred features may be combined as appropriate as would be apparent to a skilled person, and may be combined with any of the aspects of the invention.

Embodiments of the invention will now be described with reference to the accompanying drawings, in which:

FIG. 5 shows a superframe for the MAC protocol according to a preferred embodiment of the invention;

Figure 7:
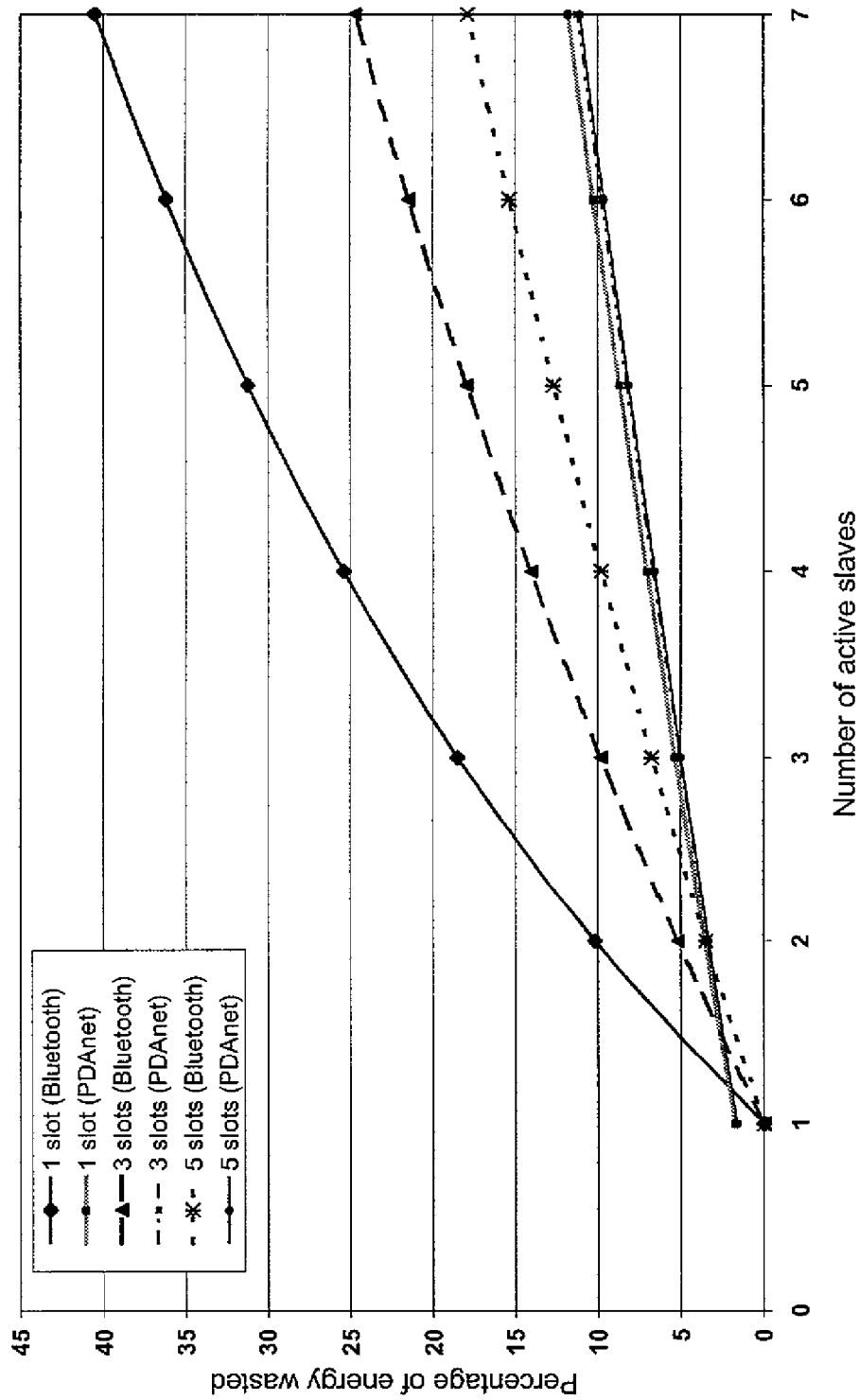
Figure 8:
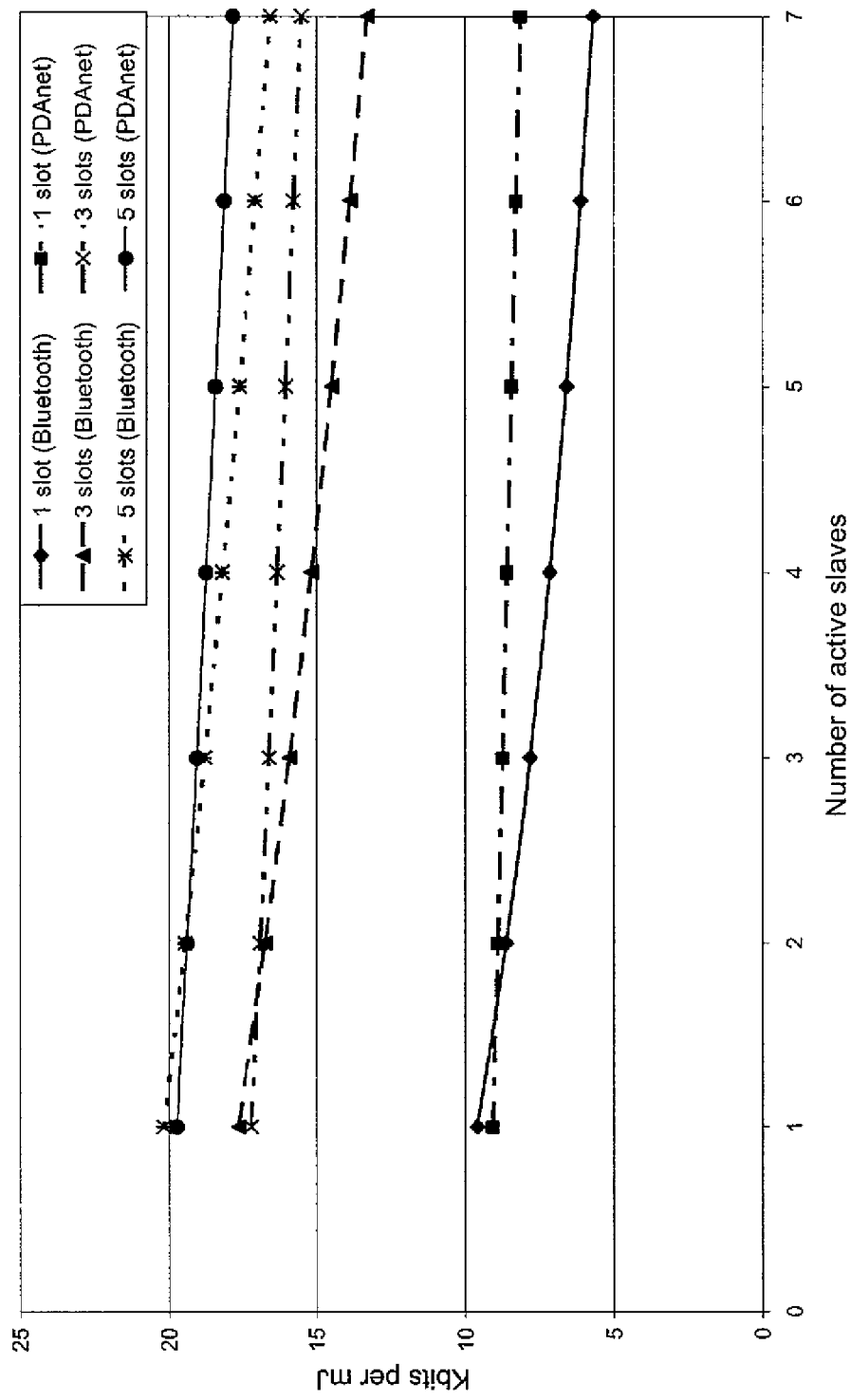
Figure 9:
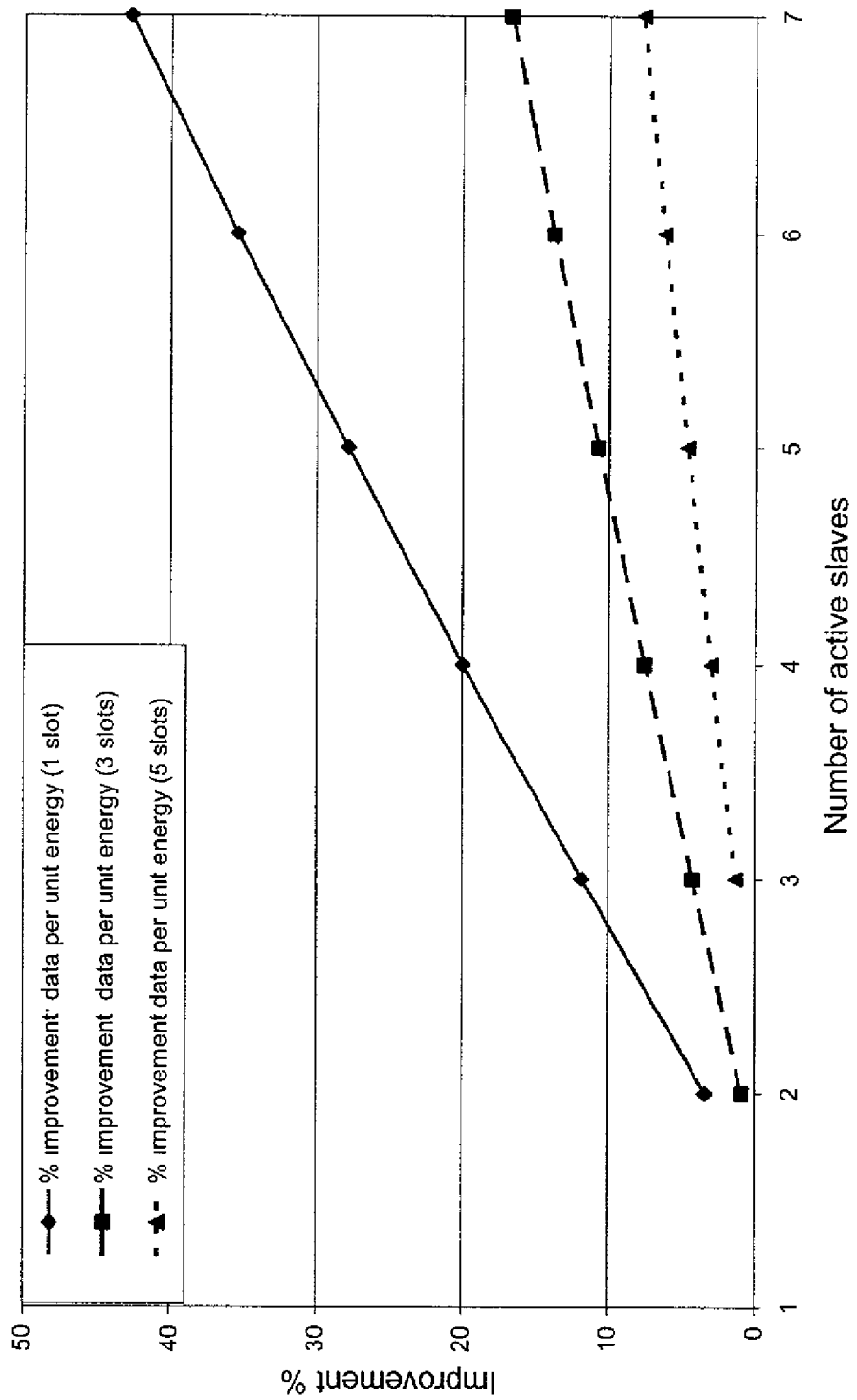
Figure 10:
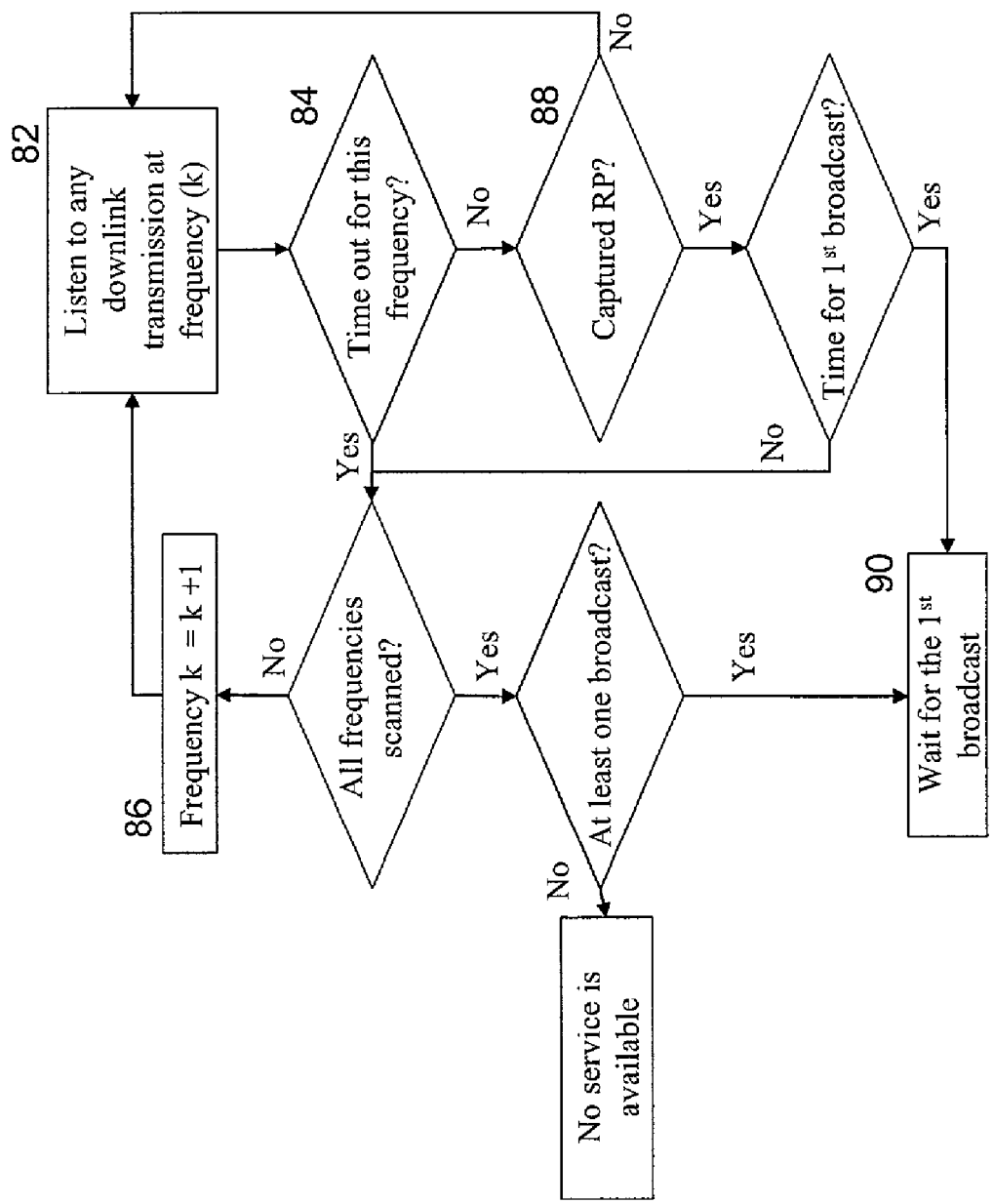
Figure 11:
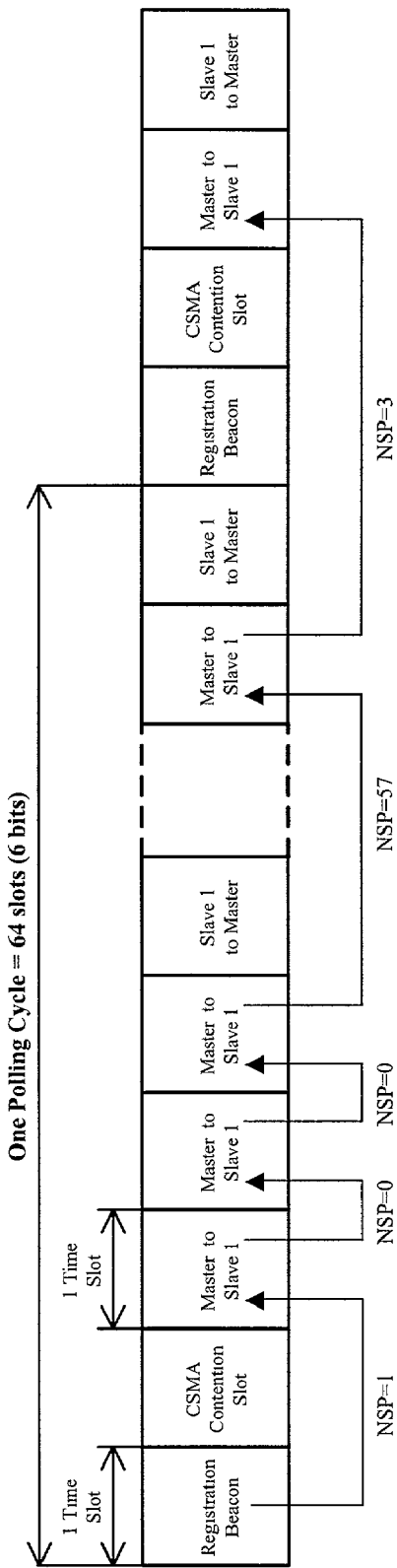

FIGS. 6(*a*) and (*b*) show procedures for synchronising and registering a slave within the wireless network of the preferred embodiment of the invention;

FIG. 7 shows a comparison of the preferred embodiment and a conventional Bluetooth network in terms of wasted energy for different packet lengths;

FIG. 8 shows transmission efficiency (data transmitted per energy consumed) for the preferred embodiment versus Bluetooth;

FIG. 9 shows relative improvement in transmission efficiency provided by the preferred embodiment;

FIG. 10 shows slave registration and service discovery in a frequency hopping variation of the preferred embodiment; and FIG. 11 shows another superframe for the MAC protocol according to a preferred embodiment of the invention.

Figure 1:
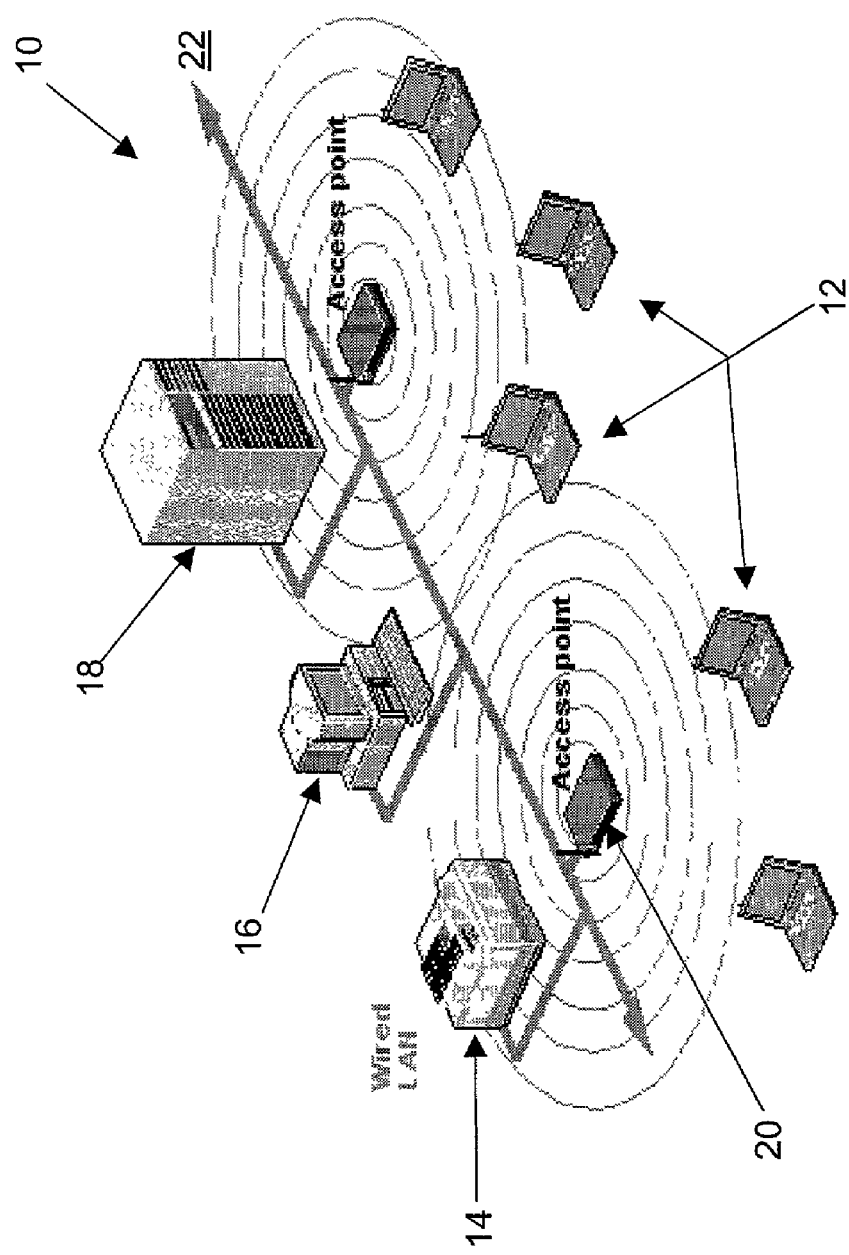
FIG. 1 shows a prior art wireless network.
Figure 2:
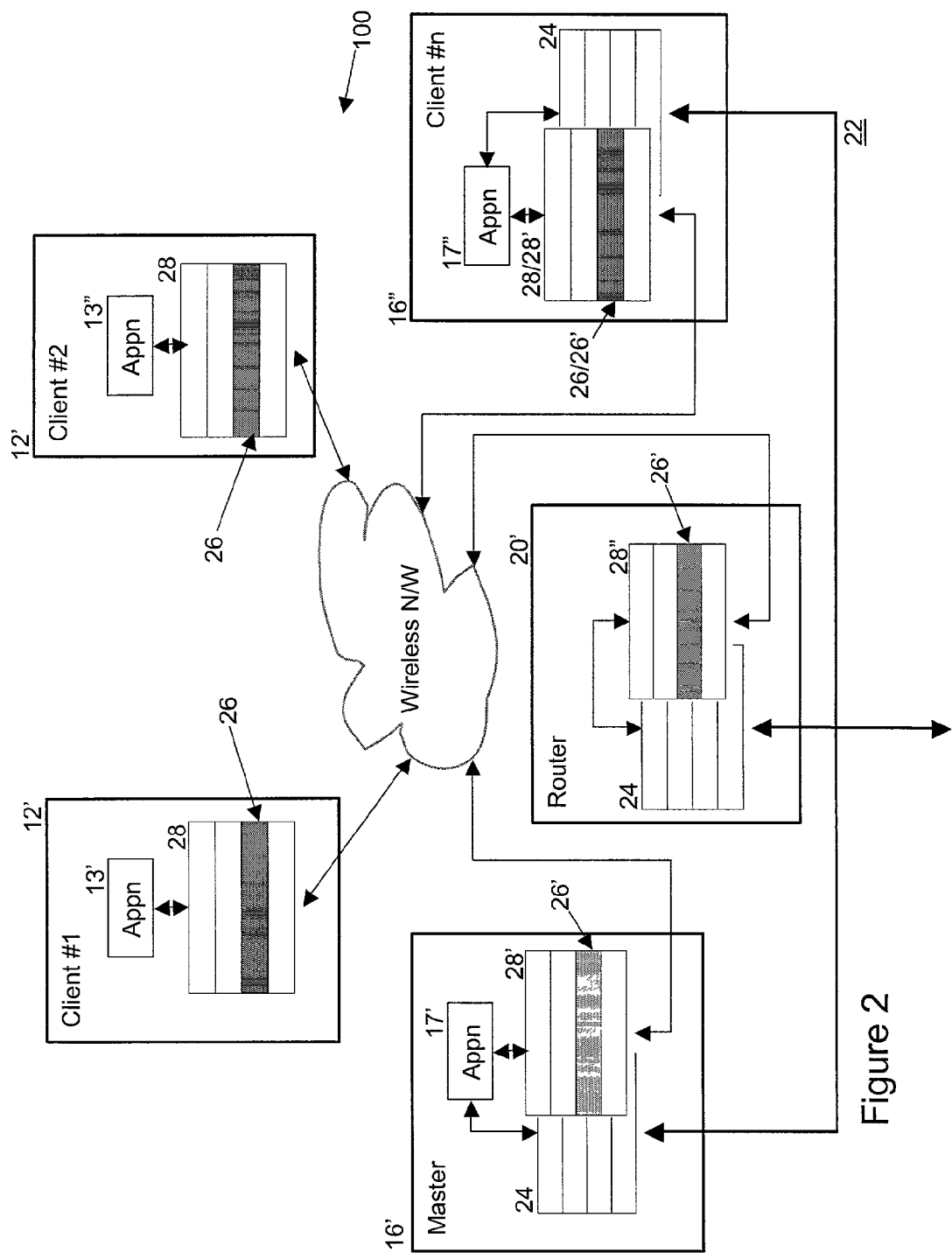
FIG. 2 shows a wireless network according to a preferred embodiment of the invention.

Referring now to FIG. 2, there is shown a communications system according to an exemplary embodiment of the present invention generally indicated at 100. The system comprises a plurality of wired devices including general-purpose computers 16', 16" and in some cases a dedicated access point 20' interconnected via a conventional type bus 22. Each of the devices 16', 16" and 20' includes an appropriate hardware adaptor such as a network card and software comprising a protocol stack enabling packets of information to be assembled for transmission on the bus 22 and disassembled and/or relayed when received from the bus 22. This enables applications running on one device within the network to communicate with other applications running on other devices within the network, for example, applications 17' and 17" running on the nodes 16' and 16" respectively.

In conventional wireless network enabled devices, each device includes a hardware adaptor allowing signals to be transmitted and received as well as software comprising a protocol stack allowing the device to participate in wireless network communications.

In the preferred embodiment of the present invention a media access control (MAC) protocol 26 or 26' software layer within a wireless device protocol stack 28, 28' is adapted to provide improved energy usage in particular within client devices 12' operating in a wireless network.

The protocol can be implemented as a modification to existing time-slotted wireless systems with minimal changes, or it can form the basis of a proprietary wireless network. In the preferred embodiment, as in Bluetooth, the protocol defines a master-slave system with the transmission mode being time division duplex where preferably equal-length time domain slots are alternately reserved for Master-to-Slave and Slave-to-Master communications.

Figure 3:
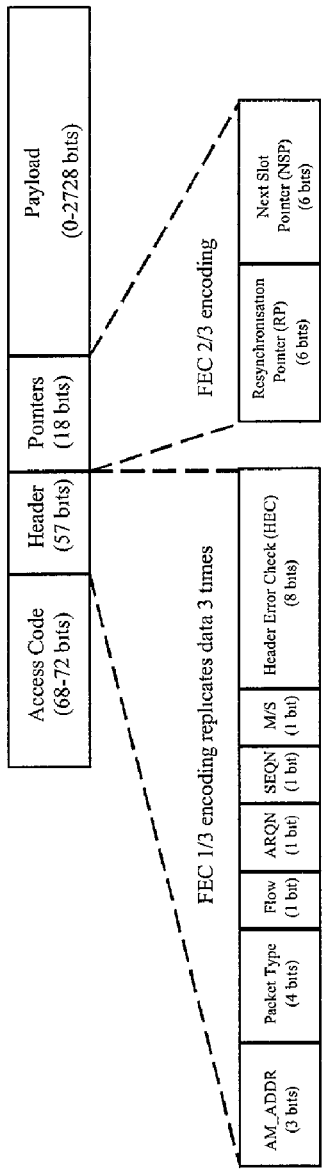
FIG. 3 shows a master-slave downlink packet format for a MAC protocol according to a preferred embodiment of the invention.

In the preferred embodiment of the present invention, a wireless network master device 16' running MAC protocol layer software 26' transmits downlink packets through a wireless adaptor (not indicated) in the format shown in FIG. 3. This format is similar to the Bluetooth format but with the addition of a preferably 1-bit Master/Slave indication within a packet header comprising a total of 57 bits and a pointer field (18 bits) included within the packet payload. The master 16' embeds a preferably 6-bit resynchronisation pointer (RP) in the pointer field of each downlink (master-slave) packet along with a preferably 6-bit Next Slot Pointer (NSP) explained later. In the preferred embodiment, both the packet header and pointer field are encoded using conventional type 1/3 and 2/3 Forward Error Correction (FEC) and so respectively include 19 header and 12 pointer bits. It will nonetheless be seen that the invention is equally implementable with 1 or more bits in the master/slave indicator, with a variety of pointer field lengths according to the length of superframe employed (explained later) and with any suitable form of error correction encoding.

Figure 4:
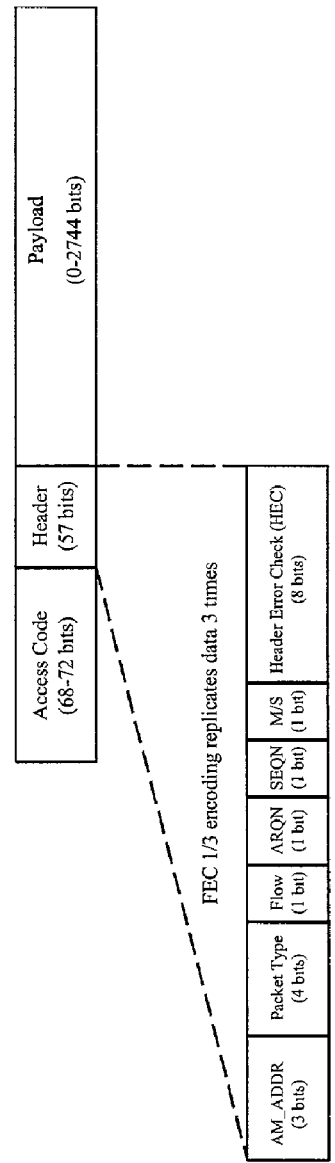
FIG. 4 shows a slave-master uplink packet format for the MAC protocol according to a preferred embodiment of the invention.

Wireless client devices 12' running MAC protocol layer software 26 transmit uplink packets through a wireless adaptor (not indicated) in the format shown in FIG. 4. These packets do not require pointers and therefore only a Master/Slave indication bit is added to the conventional Bluetooth type packet.

Referring now to FIG. 5 which shows a superframe comprising a plurality of packets of the type shown in FIGS. 3 and 4. The superframe comprises 31 consecutive pairs of application data carrying master-slave slots 40, followed by a scheduled network registration or broadcast beacon slot 42 and a contention period slot 44. The resynchronisation pointer (RP) in the pointer field of each downlink (master-slave) packet indicates the number of remaining time slots before the transmission of the broadcast beacon slot 42. In the preferred embodiment a 6-bit resynchronisation pointer is used, allowing the pointer to indicate up to 64 slots ahead—a longer pointer allows for longer superframes and vice versa. In the preferred embodiment, a complete superframe cycle comprises 64 slots although 66 could in fact be used, by employing an RP with a maximum value of 63. As will be seen later, extending the superframe cycle slightly adversely effects network synchronisation latency but also provides a slightly higher throughput. The determination of the optimum superframe length is therefore dependent on the need for slaves to synchronize versus the envisaged data loading of the network.

The registration beacon slot 42 contains a range of information including slot scheduling data and the master's ID located within the access code field, FIG. 3. Thus, once an unsynchronized slave listening for wireless network transmissions captures a packet, it can first of all determine if the packet has been transmitted by a master or a slave from the M/S bit. If this bit indicates a master transmission, the slave then knows that the RP will be included within the packet pointer field which follows, FIG. 3. The RP in turn tells the slave how long it must wait before the next broadcast beacon slot 42 allowing the slave to switch off until then. (The slave may nonetheless try alternative frequencies during this period to determine if another wireless network is available in the area, but still knowing when the broadcast beacon is available for the detected network.)

In the preferred embodiment, the slot scheduling data comprises a list of registered slave identities as well as respective next slot pointers (generally) for each registered slave. (A slave may detect that it is still registered, but for a number of reasons, the master may not need to allocate the slave a slot within the next superframe and in this case it will not receive a next slot pointer or it may be a null value.) Nonetheless, it will be seen that when a slave wakes up and checks the broadcast beacon, it will know that it is either registered or not registered. Unregistered slaves will not expect to be registered, however, if a slave had been registered and does not see its identity within the broadcast beacon, it will know that for some reason the master had decided to drop its registration. This may be because the master has failed to correctly capture a given number of packets from a slave and has simply decided that the slave is unavailable. It will be seen nonetheless that, once a slave comes back into range, to the extent that it can listen to the broadcast beacon, using the present embodiment, re-synchronisation of the slave is quick and so unilaterally dropping a slave in this manner is not a great drawback.

In the preferred embodiment, the slot 44 following a broadcast beacon is designated for carrier sense multiple access (CSMA) by slave devices, in particular, devices which are not registered within the wireless network. These unsynchronised slaves contend in this slot to request service from the master and feedback from successful requests is included in the next broadcast beacon. Many contention schemes may be adopted for the contention period. For example, the slot 44 can be divided into a number of x synchronous mini slots with a slave needing y mini slots to transmit its identity. A slave may therefore pick a random number z between 0 and $$\frac{x}{y} - 1$$

and begin transmitting its identity at z*y mini time slots into the contention period. Although it would be very unlikely for two unregistered slaves to attempt to register within the same contention period, if this occurred and their transmissions overlapped, the master would simply not register either slave. Thus, in an alternative scheme, a slave may wait for a random number less than y mini time slots and then listen for transmissions by any other slaves before attempting to transmit itself. If another slave is transmitting, the listening slave can then wait for y mini slots before listening again and trying to transmit its terminal ID.

In any case, slaves must wait until the next broadcast beacon 42 to determine if they have been registered and to obtain a next slot pointer to determine which of the master-slave pairs 40 they have been allocated. If a collision has occurred in the previous contention period, the unregistered slave will see it has not been registered and can then either attempt to register during the next contention period—the following time slot—or hold off for a random number of contention periods, hoping this will not conflict with the at least one other unregistered slave. (It is nonetheless acknowledged that this latter method will increase registration latency slightly.)

FIG. 6(a) shows in more formal terms how a new or unsynchronised slave can synchronise with the wireless network. The slave activates its receiver hardware and listens to any downlink packet transmitted from the master, step 42. In step 44, the slave extracts the RP from the packet header before entering low-power sleep mode until the next broadcast beacon, step 46. After waking up, the client listens to the broadcast beacon, step 48, where it can regain synchronisation or, in the case of a new slave, it can then decide to participate in the CSMA session during the next slot, step 50.

Referring to FIG. 6(b), when a slave decides to participate in the CSMA session, for whatever reason, it transmits its terminal ID and connection request during the CSMA period, step 52. The slave then sleeps until the next scheduled broadcast beacon, steps 54. If the slave was successful it will find its terminal ID within the broadcast beacon registration information and also an initial allocated data transmission slot during the broadcast, step 56. If not, then either because of a collision during the contention period, perhaps with another unsynchronised slave, or simply through poor communication, the slave repeats the access procedure again during the next CSMA period, step 52.

Although the RP of the preferred embodiment is an additional link layer overhead, it allows fast, controlled access to the wireless network avoiding the unnecessary latency of Bluetooth. In addition, the RP provides a method of rapid resynchronisation for any terminal that has recently lost connection with the network because of propagation related packet loss or any other reason. Furthermore, idle terminals can also use the contention period to signal the master and request a change of operating mode.

In the preferred embodiment, the master determines packet scheduling by including a next slot pointer (NSP) both in the pointer field of each downlink packet, FIG. 3, and in the broadcast beacon 42 information. So, for example, in FIG. 5, the slave n, will be provided with an NSP of value 1 during the first registration beacon 42', regardless of any NSP it may have been provided with in the previous superframe. The slave then wakes up one slot later (missing the contention period 42) to receive a master downlink packet. This will include an RP of value 61 indicating the next registration beacon will occur in 61 time slots, but it will also indicate the number of slots the slave must wait for its next master-to-slave packet. In the preferred embodiment, the NSP comprises 6 bits and so in general does not extend across more than one registration beacon. It is more likely in fact that where say 8 fully loaded slaves are operating in the wireless network, a slave will be pointed to a next master-to-slave slot 16 slots afterwards in the superframe.

This is different from a more common approach in wireless networks where a block of slots for each slave is pre-allocated within each superframe, see "Channel state dependent resource scheduling for wireless message transport with framed ALOHA-reservation access protocol", Inoue M., IEICE Trans. Fundamentals of Electronics, Communications and Computer Sciences 2000; E83-A(7): 1338–1346. However, fast changing radio propagation conditions may lead to sustained packet loss during the pre-allocated block and network throughput will be reduced.

In the preferred embodiment, the NSP introduces a higher level of control and enables the master to intelligently schedule slots on a packet-by-packet basis. Slaves normally transmit immediately following receipt of a downlink packet. The NSP, extracted from the header of the last downlink packet received, then indicates to the slave when to expect the next downlink. The slave simply enters sleep mode until that time. If a poor quality link is detected, the master can react quickly within the current superframe cycle by reducing any further allocation of slots to the relevant slave. Therefore, wasted slots are kept to minimum. The scheduling information in the broadcast beacon comprises only the next allocated slot for each slave, rather than the next batch of allocated slots. The broadcast overhead is therefore reduced.

There are many variations to the semantics of the NSP value employed within a network according the invention. Using the example of FIG. 11, it will be seen that where the NSP for slave 1 is set to zero in a downlink packet, it indicates to the slave not to sleep for the next slot and so to keep listening to master downlink packets. In the example, the master transmits packets during three sequential time slots before allowing slave 1 to respond. In the third packet, the NSP value is 57 so causing slave 1 to wait until almost the end of the superframe before receiving another master packet. The NSP in this packet is set to 3 and the NSP for the slave in the registration beacon would be set to 1, both indicating to slave 1 to listen in the slot after the contention period. This use of a null NSP value allows for non-symmetric master-slave transmissions to be employed within the network.

If the NSP value for a slave were set to zero within the broadcast beacon this could cause the slave to listen in the slot immediately after the broadcast beacon, rather than causing the slave to sleep until the next broadcast beacon as mentioned above. This might be useful when the network is fully loaded with registered slaves and the master does not expect further slaves to contend for registration on the network.

If such semantics were used, the master could also set the NSP for all slaves to zero in the broadcast beacon, causing all slaves to listen to a sequence of master downlink packets. In this case, the master could use a short-superframe so causing all slaves to wait until at least the next broadcast beacon before receiving individual slot information from the master and having the opportunity to transmit to the master. This might be useful where the master almost continually broadcasts the same information to all slave devices in a network, for example, in a library or museum where information about exhibits in a room is transmitted.

In popular applications such as a campus Intranet, the portable terminals are usually clients who request a large amount of data from fixed network servers via access points (i.e. a wireless network master). As the data flow may be asymmetric, the preferred embodiment gives the master control over the ratio of downlink to uplink slots. It is also possible to extend this adaptability by implementing an intelligent scheduler at the master based on the average data loading of each terminal over the past few superframes. Similarly, if required the master can take into account the link conditions by using the packet error rate or dropped packet rate as a factor in the scheduling algorithm, see "Frequency look ahead and link state history based interference avoidance in wireless pico-cellular networks", Anvekar D K, Kapoor M., Proc. IEEE Intl. Conf. Personal Wireless Communications 2000; 434–438. This approach also maximises network throughput and reduces overall energy consumption whereas sending packets over a poor quality link or turning on a RF transceiver for a null packet increases terminal energy consumption.

It will be seen that at the MAC protocol layer level, the preferred embodiment operates in a master slave mode. It will nonetheless be seen that higher level software can allow the implementation of peer to peer type communication where, for example, if two client applications 13', 13" wish to communicate, they may cause their MAC protocol layer to for example listen not only for communications to and from their own terminal ID but that of the other slave's terminal ID. This may enable slaves to communicate more efficiently rather than having the master 16' relay messages from one to the other.

In more normal applications, however, the client applications 13', 13" may be browsers sending higher level WAP (Wireless Application Protocol) or HTTP (HyperText Transfer Protocol) requests to a server application 17' running on the network master 16'. The server application 17' in turn routes the requests through the wired protocol stack 24 to a remote web server to which the request is directed and receives the web server response, perhaps containing WML (Wireless Markup Language) or HTML (HyperText Markup Language) information, for relaying back to the slaves through the wireless protocol stack 28'.

It will be seen that while the preferred embodiment has been described in terms of a master device 16' having protocol layer software sending packets of the form shown in FIG. 3 and a mobile slave device 12' having protocol layer software sending packets of the form shown in FIG. 4, the invention may also be implemented within a stand-alone wired access point 20'. In this case, the device 16' might not have wireless hardware or its hardware may have malfunctioned. The application 17' would communicate its data for the wireless network through its wired protocol stack 24 to the access point 20', which acts as a master for the wireless network. The access-point software then re-packets the application data into downlink packets of the type shown in FIG. 3. Thus, its MAC protocol layer software 26' acts in the same manner as the MAC protocol layer software 26' in the master device 16'. Similarly, when the access point 20' receives slave packets through its wireless protocol stack 26', it relays the client data contained therein to the device 16' for processing by the application 17'. It will be seen that the MAC protocol layer software 26' within the access point 20' may implement the registration of slaves signalling during the contention period 44. However, the balancing and allocation of the pairs of application data carrying master-slave slots 40 may be determined either in the access point 20' or by the application 17'.

The invention may be further extended to provide redundancy within the wireless network. For example, where two devices 16', 16" include both wired and wireless hardware adaptors and corresponding protocol stacks 24, 26, one device in this case 16' may act as a default master, whereas the other 16" may act as a default slave. The default slave runs MAC protocol layer software 26 of the type running in the wireless clients, and simply listens for master broadcasts. The master 16' need not even allocate a slot pointer to the slave 16" and it may simply stay registered and listening for broadcast beacons 42. If the slave 16" loses the broadcast beacon and fails to re-synchronize and/or if a problem with the master device 16' is detected through the wired network, the slave 16" then swaps its MAC layer software 26 to act as a master and to load the application being previously run on the device 16'. In this case, only one logical wireless network will be running at any given time and so only one frequency band will be employed at any given time to operate the network, so preventing excessive use of the spectrum.

More usefully, however, when two such devices 16', 16" are available within the same geographical area and frequency bands or orthogonal hopping sequences are considered to be available, the devices may act as respective masters within two logical wireless networks. In this case, it can be advantageous for the broadcast beacon slot 42 to be used by each master to provide information concerning the types of service offered by their respective wireless network.

This in turn enables a slave to select from a plurality of geographically overlapping wireless networks according to the service it requires. So, for example, one master may act as a print server, whereas the other may act as an Internet access point so balancing network and processing load between the servers. To reduce the length of time for service discovery, a new slave preferably tries to capture as many packets from different wireless networks before listening to the first broadcast beacon. A list of broadcast beacon times can be kept so that if the services available in this first wireless network are not suitable, then the slave can quickly obtain information from the broadcast beacon of the second wireless network and so on. Once the slave has identified that it wishes to join a particular wireless network, its registration request can be transmitted to the Master during the relevant CSMA slot. Note that the registered slave retains the list of Master addresses so that it can quickly resynchronise if it fails to receive the correct next slot pointer.

The service discovery procedure allows for uninterrupted network operation and a high degree of control. In addition, the resynchronisation time in normal situations should be no longer than 2 superframes (80 ms when using 625 μs slots and 6-bit pointers). This mechanism also lets slaves easily participate in multiple wireless networks since the Master devices are not required to suspend wireless network operation for the slave registration procedure.

To illustrate the advantages of the new approach, the steady-state performance of the standard Bluetooth MAC protocol was compared with a modified version of the Bluetooth MAC protocol according to the preferred embodiment of the invention. Bluetooth uses time slots of 625 μs duration and devices can be operated in 4 different transmission modes: active, sniff, hold and park mode. There are 3 different packet sizes for active mode data transmission, each single packet occupying 1, 3 or 5 slots. The Bluetooth physical layer uses 1 Msymbol/s Gaussian-filtered frequency shift keying (GFSK) modulation in a 2.45 GHz frequency hopping spread spectrum (FHSS) system. The maximum transmission duration in a single slot is limited to 366 symbols due to the need for a guard period to accommodate frequency hopping. Therefore, to achieve the maximum asymmetric downlink throughput of 723.2 kbps, frequency hopping does not occur during the 5-slot packet. Although a higher throughput is obtained, there is a greater risk of packet collisions or interference caused by either another Bluetooth wireless network or ISM-band (Industrial, Scientific and Medical band—a part of the radio spectrum that can be used by anybody without a license in most countries) user in a close proximity. Increasing the packet length also increases the packet error rate for a particular level of link quality (i.e., bit error rate) and the number of packet retransmissions will grow rapidly, see "Data Communications for Engineers", Duck M, Bishop P, Read R., Addison Wesley: Harlow, England, 1997; 120–123.

As indicated above, in contrast to the present invention, Bluetooth employs complex procedures to establish connections with relatively long access times. The Page and Scan procedure can require up to 7.6 seconds to complete when the device type is known, see "Bluetooth-A new low-power radio interface providing short-range connectivity", Haartsen J C, Mattisson S., Proceedings of the IEEE 2000; 88(10):1651–1661.

Each Bluetooth slave must listen to the header of every downlink packet. Therefore, if there are 7 active terminals in a wireless network, 6 terminals are listening to each downlink packet header unnecessarily. However, if a 5-slot packet is detected the other slaves will enter sleep mode until the next downlink slot. In contrast, the maximum sleep duration in the preferred embodiment is 2 slots less than the superframe length as all active slaves must wake and listen to the broadcast beacon.

A steady-state analysis was carried out to determine how the proportion of energy wasted is related to the number of active slaves in both the system of the preferred embodiment and a Bluetooth system. The analysis considered the 3 different packet lengths available using Bluetooth and both systems were assumed to operate over the same hardware. The relevant dynamic connection procedures were not included and each slave is assumed to be 100% loaded (data always available for both uplink and downlink). Tables 1 to 3 compare the calculated normalised energy consumption figures, throughput and transmission efficiency (kbits/mJ) for both Bluetooth and the system of the preferred embodiment. The normalised energy consumption figures are based on RF hardware consuming 40 mJ/s when receiving, 32 mJ/s when transmitting and 0.065 mJ/s when idle, see Bluetooth Radio PBA 313 Datasheet, www.ericsson.com. The analysis is based on a superframe of 64 slots and takes into account the relevant system overheads (i.e. the broadcast beacon, additional pointers and the inspection of packet headers in Bluetooth). The analysis is based on an error free environment therefore only unprotected packet types are being used.

FIG. 7 was derived from Tables 1 to 3 and confirms that the system of the preferred embodiment wastes less energy than Bluetooth when more than two slaves are active. With the system of the preferred embodiment, the amount of wasted energy does not depend on the packet size because the overheads (broadcast and next slot pointer) are fixed. When there are 7 active slaves in the network and 5 slot packets are being used, 17.9% of the total energy consumption is wasted by Bluetooth, falling to 11.1% for the system of the preferred embodiment. This is an improvement of 38%. However, when using a 1-slot packet, the default packet type in most implementations, 40.5% of the total energy is wasted in Bluetooth, falling to 11.8% with the system of the preferred embodiment. Here the use of the RP and NSP gives a 70.8% improvement over Bluetooth.

The pointers and broadcast beacon used in the system of the preferred embodiment marginally reduce the downlink data throughput (by 5.2% for a 1-slot packet, falling to 2.1% for a 5-slot packet). However, the transmission efficiency (amount of data bits transmitted per unit energy consumed) is still higher than with Bluetooth, FIG. 8. To demonstrate the significance of these results, FIG. 9 shows the improvement in transmission efficiency offered by the system of the preferred embodiment which can be up to 42.8% (for 7 active slaves and using 1-slot packets) and of course higher transmission efficiency means longer battery lifetime for the mobile terminal.

The results presented in Tables 1–3 and FIGS. 7–9 suggest that the present approach is beneficial for mobile terminals when the wireless network is heavily loaded. In cases where the data loading is usually light, there are currently a number of power saving schemes available. These include sniff mode in Bluetooth or power saving polling (PSP) mode in IEEE 802.11 and they provide reasonable power saving for handheld terminals, see "High-speed Wireless ATM and LANS", Bing B., Artech House: Boston, 2000; 100–102.

However, the system of the preferred embodiment also delivers power savings in light loading conditions by means of the regular broadcast beacon. For example, a terminal may periodically listen to the broadcast beacon once every superframe cycle to determine if there is data waiting to be downloaded from the master. To extend power saving even further, a handheld terminal can listen the broadcast beacon every so many superframe cycles. However, there is a direct trade-off between reasonable latency (on the downlink) and the desired power saving. In addition, the present protocol is not only concerned with terminal power savings since it also introduces a high degree of flexibility in setting the defer interval between data transmissions. The use of packet embedded pointers enables flexible scheduling without the need to exchange higher layer messages to negotiate for an agreed sniff period, see "Bluetooth Connect Without Cables", Bray J, Sturman C F, Prentice Hall: New Jersey, 2001; 318–320.

The preferred embodiment has so far been described independently of the frequency on which the master and slaves transmit packets. Frequency hopping is a popular spread spectrum technique used in short range wireless networks to combat unwanted interference, see "Theory of spread spectrum communications—a tutorial", Pickholtz R L, Schilling D L, Milstein L B, IEEE Transactions on Communications 1982; 30(5): 855–884. This enables devices operating in the ISM bands (e.g. 2.4 GHz) to cope with interference from other unlicensed transmitters that are sharing the same frequency spectrum. Frequency hopping also allows for the coexistence of multiple overlapping wireless networks within the same operating band. However, a well-designed hopping algorithm is required to reduce the chance of packet collisions. In some short-range wireless networks, the frequency hopping sequence is derived from the hardware address of the Master device in the wireless network—in the present case, this is included in the Access Code field, FIG. 3.

The use of frequency hopping is straightforward with the present invention and leads to some useful advantages. Referring now to FIG. 10, which illustrates the method by which a slave wishing join a wireless network according to the present invention where frequency hopping is employed. The slave first listens for activity at a spot frequency, step 82. If there is no transmission activity for one superframe period, step 84, and all frequencies have not been scanned then the slave hops to the next adjacent frequency, step 86, and listens until another time out occurs. If a packet has been captured during the listening time, then the resynchronisation pointer RP can be extracted, step 88. The resynchronisation pointer gives the time slot for the next broadcast beacon. In some implementations, the frequency hopping pattern can be extracted from the Master device's hardware address. As the hardware address is often part of the packet preamble (as a synchronisation word or access code), the new slave can then calculate the hopping sequence. If this is not implemented, the resynchronisation pointer may be extended to include both time slot and frequency channel information. Now that the slave knows the time and frequency for the next broadcast beacon, it can power down and sleep until then, step 90.

It will nonetheless be seen that a slave knowing that wireless networks to which it may be interested in connecting will eventually transmit on a given frequency may simply listen on a single frequency for a given time period—probably exceeding the length of a number of superframes. If it does not capture a downlink packet in that time, it decides no wireless services are available, whereas if it does, it can immediately determine when and at what frequency the next broadcast beacon will be transmitted. It should also be noted that this technique could only be used either if a frequency hopping master device is available or if the constant broadcasting frequency of the master is known—in general the latter is unlikely.

It will be seen that while the preferred embodiments have been described in terms of an adaptation of the Bluetooth protocol, the essential features of the invention as claimed are derivable from these embodiments are equally implemented within other network protocols, for example, IEEE 802.11 family, HiperLAN and HomeRF.

TABLE 1a

Steady-state results for 1 slot unprotected packet in Bluetooth.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 36.0 | 172.8 | 172.8 | 345.6 | 9.6 |
| 2 | 20.0 | 86.4 | 86.4 | 172.8 | 8.6 |
| 3 | 14.7 | 57.6 | 57.6 | 115.2 | 7.8 |
| 4 | 12.1 | 43.2 | 43.2 | 86.4 | 7.2 |
| 5 | 10.5 | 34.6 | 34.6 | 69.2 | 6.6 |
| 6 | 9.4 | 28.8 | 28.8 | 57.6 | 6.1 |
| 7 | 8.6 | 24.7 | 24.7 | 49.4 | 5.7 |

TABLE 1b

Steady-state results for 1 slot unprotected packet in PDAnet.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 36.1 | 157.5 | 170.1 | 327.6 | 9.1 |
| 2 | 18.4 | 78.8 | 85.1 | 163.9 | 8.9 |
| 3 | 12.5 | 52.5 | 56.7 | 109.2 | 8.8 |
| 4 | 9.5 | 39.4 | 42.5 | 81.9 | 8.6 |
| 5 | 7.8 | 31.5 | 34.0 | 65.5 | 8.4 |
| 6 | 6.6 | 26.3 | 28.4 | 54.7 | 8.3 |
| 7 | 5.7 | 22.5 | 24.3 | 46.8 | 8.2 |

TABLE 2a

Steady-state results for 3 slot unprotected packet in Bluetooth.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 38.0 | 585.6 | 86.4 | 672.0 | 17.7 |
| 2 | 20.0 | 292.8 | 43.2 | 336.0 | 16.8 |
| 3 | 14.1 | 195.2 | 28.8 | 224.0 | 15.9 |
| 4 | 11.1 | 146.4 | 21.6 | 168.0 | 15.2 |
| 5 | 9.3 | 117.1 | 17.3 | 134.4 | 14.5 |
| 6 | 8.1 | 97.6 | 14.4 | 112.0 | 13.9 |
| 7 | 7.2 | 83.7 | 12.3 | 96.0 | 13.3 |

TABLE 2b

Steady-state results for 3 slot unprotected packet in PDAnet.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 38.0 | 570.2 | 85.1 | 655.3 | 17.2 |
| 2 | 19.4 | 285.1 | 42.5 | 327.6 | 16.9 |
| 3 | 13.1 | 190.1 | 28.4 | 218.5 | 16.6 |

TABLE 2b-continued

Steady-state results for 3 slot unprotected packet in PDAnet.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 4 | 10.0 | 142.5 | 21.3 | 163.8 | 16.3 |
| 5 | 8.2 | 114.0 | 17.0 | 131.0 | 16.1 |
| 6 | 6.9 | 95.0 | 14.2 | 109.2 | 15.8 |
| 7 | 6.0 | 81.5 | 12.2 | 93.7 | 15.5 |

TABLE 3a

Steady-state results for 5 slot unprotected packet in Bluetooth.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 38.7 | 723.2 | 57.6 | 780.8 | 20.2 |
| 2 | 20.0 | 361.6 | 28.8 | 390.4 | 19.5 |
| 3 | 13.8 | 241.1 | 19.2 | 260.3 | 18.8 |
| 4 | 10.7 | 180.8 | 14.4 | 195.2 | 18.2 |
| 5 | 8.9 | 144.6 | 11.5 | 156.1 | 17.6 |
| 6 | 7.6 | 120.5 | 9.6 | 130.1 | 17.1 |
| 7 | 6.7 | 103.3 | 8.2 | 111.5 | 16.6 |

TABLE 3b

Steady-state results for 5 slot unprotected packet in PDAnet.

| Number of active slaves | Normalised energy consumption (mJ/s) | Downlink throughput per slave (kbps) | Uplink throughput per slave (kbps) | Total throughput (kbps) | Transmission efficiency (kbits/mJ) |
|---|---|---|---|---|---|
| 1 | 38.7 | 707.7 | 56.7 | 764.4 | 19.8 |
| 2 | 19.7 | 353.9 | 28.4 | 382.3 | 19.4 |
| 3 | 13.4 | 235.9 | 18.9 | 254.8 | 19.1 |
| 4 | 10.2 | 176.9 | 14.2 | 191.1 | 18.8 |
| 5 | 8.3 | 141.5 | 11.3 | 152.8 | 18.4 |
| 6 | 7.0 | 118.0 | 9.5 | 127.5 | 18.1 |
| 7 | 6.1 | 101.1 | 8.1 | 109.2 | 17.9 |

The invention claimed is:

1. A master wireless network device including a wireless medium adaptor and a component implementing a medium access protocol, said component being arranged to cause said adaptor to transmit temporally spaced packets of information, and said component being arranged to receive packets of information through said adaptor from slave network devices, at least some of said transmitted packets including a pointer indicating the relative time before which a designated packet of information will be transmitted, said designated packet of information including an indication of the slave network devices participating in said network and respective indications as to when participating slave network devices should transmit packets of information for reception by said master wireless network device.

2. A master wireless network device according to claim 1 wherein said component is adapted to receive packets of information from one or more slave network devices not participating in said network during a pre-determined time period between packets of information transmitted by said master wireless network device.

3. A master wireless network device according to claim 1 wherein said component is arranged provide said respective indications as to when participating slave network devices should transmit packets of information, so that packets of information transmitted by said master wireless network device alternate with packets of information transmitted by respective slave network devices.

4. A master wireless network device according to claim 3 wherein at least some of the packets of information transmitted by said master wireless network device include a further pointer indicating to a slave device which is to transmit a packet next, when said master wireless network device is to transmit a packet for said slave device next.

5. A master wireless network device according to claim 1 wherein said component is arranged to cause said wireless medium adaptor to transmit packets of information on different frequencies.

6. A master wireless network device according to claim 5 wherein said component is arranged to cause said wireless medium adaptor to transmit packets of information on frequencies which are a function of the identity of said master wireless network device.

7. A master wireless network device according to claim 1 wherein said component is arranged to include in at least some transmitted packets of information an indication of the frequency on which said designated packet of information will be transmitted.

8. A master wireless network device according to claim 1 wherein said component is arranged to include in said designated packet of information an indication of network services offered by said master wireless network device.

9. A slave wireless network device including a wireless medium adaptor and component implementing a medium access protocol, said component being arranged to cause said adaptor to transmit temporally spaced packets of information, and said component being arranged to receive packets of information through said adaptor from one or more master network devices, at least some of said received packets including a pointer indicating the relative time before which a designated packet of information will be transmitted by said master network device, said designated packet of information including an indication of the slave network devices participating in said network and respective indications as to when participating slave network devices should transmit packets of information for reception by said master wireless network device.

* * * * *